Aug. 5, 1958
C. H. BEARE
2,845,657
MOLDING APPARATUS AND METHOD
Filed May 13, 1953
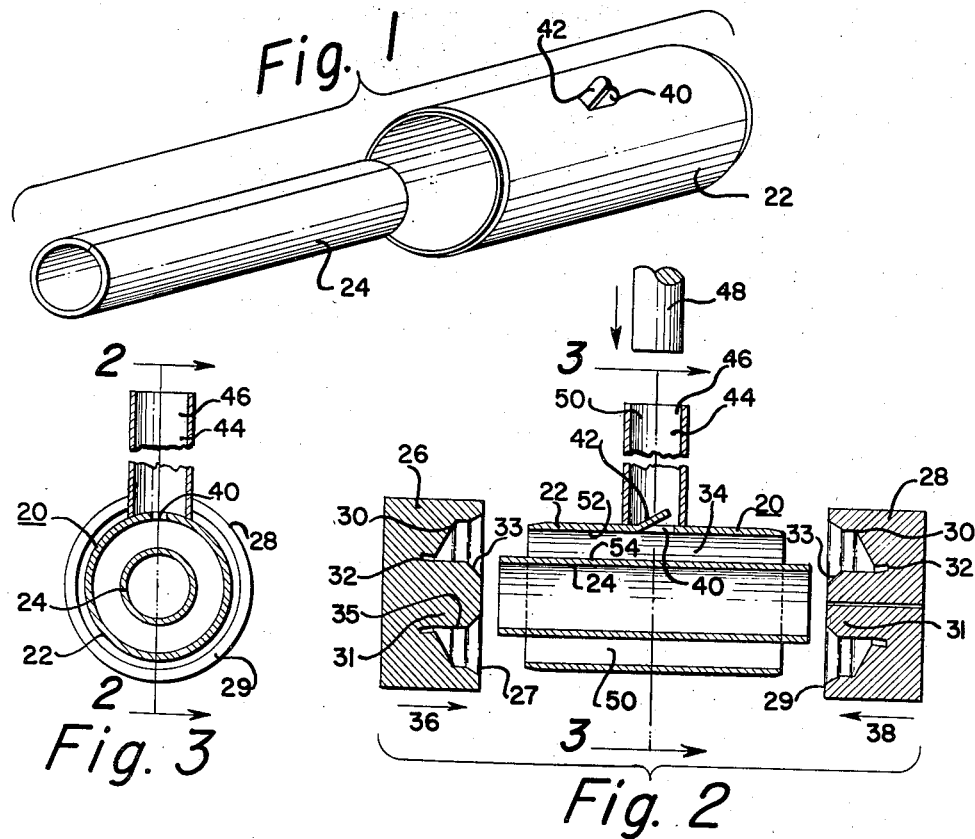
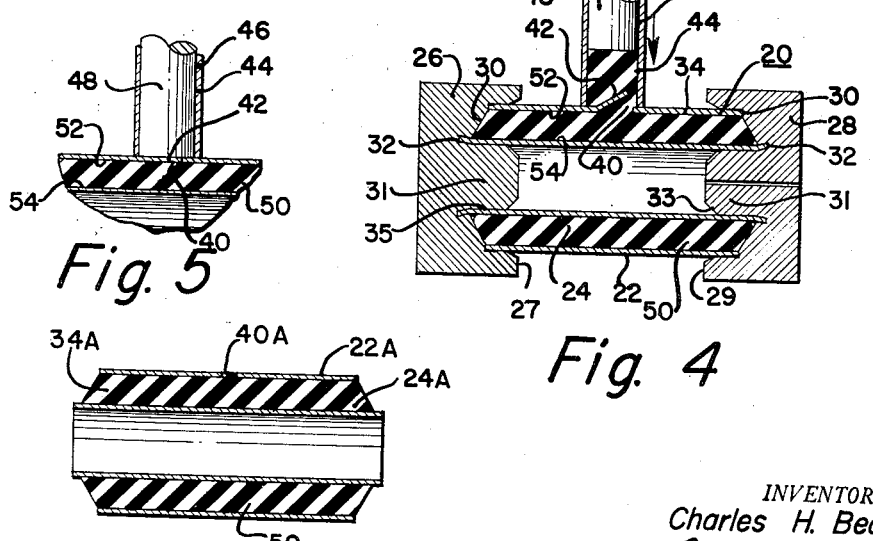
INVENTOR.
Charles H. Beare
BY
His Attorney

2,845,657

MOLDING APPARATUS AND METHOD

Charles H. Beare, Dayton, Ohio, assignor to General Motors Corporation, Detroit, Mich., a corporation of Delaware Application May 13, 1953, Serial No. 354,858

4 Claims. (Cl. 18—36)

This invention relates to molding of curable plastic material and more particularly to a method and apparatus wherein plastic material is shaped and cured.

An object of the present invention is to provide a method for molding plastic articles whereby the material is shaped under pressure in individual molds and maintained under pressure therein during a curing process.

A further object is to provide a method and mold for molding curable plastic material within a mold cavity formed between a pair of sleeves held in nested spaced relation by removable covers when said covers interlock with portions of one of said sleeves.

It is another object of the present invention to provide a mold for plastic material wherein the material is cured and maintained under pressure while being simultaneously bonded in situ to a metallic sleeve which forms a portion of the mold.

It is an object of the present invention to provide a method for molding plastic material between a pair of nested sleeves while simultaneously bonding the material to at least one of said sleeves, including the steps of nesting two sleeves in spaced relation to each other, applying and securing covers to the ends of the nested sleeves for maintaining the sleeves in spaced relation while forming a closed annular space between said sleeves, injecting under pressure an uncured plastic material through an aperture in one of said tubes, said aperture permitting passing said material in one direction and restricting flow thereof in the reverse direction.

In carrying out the above objects another object of the invention is to mold curable plastic material by the method described wherein the material is cured and simultaneously bonded to metal inserts within the mold.

A still further object of the present invention is to cure plastic material and simultaneously bond the material in situ to a metallic part forming a portion of the mold wherein the material is shaped and cured. This object is specifically accomplished by forming a mold from an assembly of a metallic sleeve with a pair of covers for closing the ends thereof and secured in a predetermined position wherein said sleeve has an aperture being constructed and arranged for passing injected uncured material into the mold cavity and for maintaining said material under pressure within said mold cavity subsequent to the removal of injecting pressure.

In carrying out the above objects, another object of this invention is to provide a mold wherein an annulus of curable plastic material is cured and bonded in situ to a pair of nested concentric sleeves or tubes. This object is materialized by providing a pair of spaced concentric tubes each having a predetermined length and providing a pair of covers for the ends of said tubes. Each of said covers having a pair of concentric grooves on one surface thereof wherein the tubes are maintained in spaced relation when end portions of the tubes are held therein, an aperture being provided in one tube whereby material is injected therethrough to enter a mold cavity.

A still further object of the present invention is to provide a method for molding curable plastic material within a sleeve wherein a metallic sleeve is provided with an aperture in a surface thereof including an outwardly bent tang integrally attached to said surface and formed of the material removed when forming said aperture, applying covers to the ends of said sleeve for forming a confined mold cavity between said covers and the interior surface of said sleeve, injecting under pressure a predetermined quantity of uncured plastic material through said aperture to fill said cavity, deforming said tang to fill said aperture for sealing the material within said sleeve, and finally removing said covers from the sleeve to provide a formed and cured article within said sleeve.

Further objects and advantages of the present invention will be apparent from the following description, reference being had to the accompanying drawings wherein a preferred embodiment is clearly shown.

In the drawing:

Fig. 1 is an expanded view in perspective of two tubes.

Fig. 2 shows the tubes in Fig. 1 in a nested arrangement with covers adapted to be positioned on the tube ends.

Fig. 3 is a view taken along lines 3—3 in Fig. 2.

Fig. 4 diagrammatically in section shows the tubes and covers in Fig. 2 as assembled with an injecting means in position over an aperture in a tube.

Fig. 5 in section shows the apertures in Fig. 4 as closed by a tang portion of the tube.

Fig. 6 shows a modification of the invention wherein an aperture without a tang is provided in a tube wall.

Referring to the drawings and particularly to Fig. 2 the numeral 20 designates a mold the parts of which are shown in partly assembled relation. Mold 20 consists of a pair of concentrically spaced sleeves or tubes 22 and 24 and covers 26 and 28 for the ends of the tubes. Covers 26 and 28 each have a pair of concentric grooves 30 and 32 formed on surfaces 27 and 29 respectively which are spaced and adapted after assembly for maintaining the tubes in spaced concentric relation to each other. Thus grooves 30 are suitably located and shaped for positioning tube 22 while grooves 32 have portions thereof slightly outwardly directed as shown in the drawings so as to engage the ends of the tube 24 and outwardly deform said ends when the covers are forced toward each other by a suitable means (not shown), in the direction indicated by arrows 36 and 38 in Fig. 2.

When the covers are in position, an annular space or cavity 34 will be formed between tubes 22 and 24 and covers 26 and 28. It is manifest that tube 24 when outwardly flared in grooves 32 will securely lock covers 26 and 28 to the respective ends and thus form the composite mold 20. To aid in the location of tube 24 within deforming grooves 32 a projection 31 is provided on surfaces 27 and 29 of covers 26 and 28. The sides of the projection are angularly tapered for engaging the inner surfaces of tube 24 and flaring the ends thereof into position in grooves 32 as tube 24 is brought into a deforming and subsequent locating relation with covers 26 and 28. The projection 31 may be formed so as to extend a distance into tube 24 and may be suitably sized to have shoulder portions 35 which maintain the rounded configuration of the tube and thus permit a seamed tube as shown in Fig. 1 to be utilized so as to reduce the cost of such subsequently formed article.

Tube 22 is provided with an aperture 40 in an outer surface thereof. The aperture 40 when formed in some suitable manner as by punching, has an outwardly extending tang 42 attached thereto which is formed from the material of the tube as it is removed during the formation of the aperture 40.

After the assembly of the various parts has been accomplished, aperture 40 and tang 42 are positioned in positive relation to an injecting mechanism 44 diagrammatically shown in Fig. 2 of the drawings. The injecting mechanism 44 may have a cylinder of predetermined volume 46 and a piston 48 movable within the cylinder for injecting the predetermined volume of material in cylinder 46 through aperture 40 into the mold cavity 34. It is manifest if cylinder 46 is of appropriate volume, cavity 34 will be completely filled and the material therein will be placed under pressure when the piston 48 bottoms in cylinder 46. This pressure is then maintained in the mold cavity 34 when piston 48 engages tang 42 of tube 22 to force it into an aperture closing position as shown in Fig. 5 of the drawing. The mold is then removed from the injecting means 44 and placed in a retort or other suitable heating apparatus (not shown) wherein the material 50 is cured by some suitable process. If desired the material may be bonded in situ during the curing to surface 52 of tube 22 and surface 54 of tube 24 if suitable bonding techniques are employed. At the conclusion of the cure the mold is removed from the heating apparatus and the end covers 26 and 28 are removed from the tubes 22 and 24 to provide a cured annulus 50 adapted to be used in connection with metallic sleeves as commonly used in automotive spring shackles, etc.

In Fig. 6 of the drawings a modification of the present invention is shown. In this embodiment an aperture 40A, provided in tube 22A, permits passage of uncured plastic material under pressure into mold cavity 34A when suitable injecting presses (not shown) are used and is sized to provide an effective dam against the outward flow of the material after the injecting pressure is removed. This may be accomplished if the aperture 40A is of such size that the frictional component of the material when engaging the periphery of the aperture 40A is greater than the force component of the material under pressure in mold cavity 34A, so as to form a meniscus of material about the opening and effectively maintain the material 50 under pressure within the cavity 34A.

Further the metallic portions of the sleeves may be suitably worked as by swaging to form a spring shackle bushing as shown in Patent 1,983,796 to Harvey D. Geyer, assigned to the assignee of the present invention, and the ends of the sleeves may be suitably swaged as to bring the plastic material contained therein under any desired state of compression.

It is apparent that covers 26 and 28 are not appreciably effected during the steps outlined above and are suitable for reuse in the method heretofore fully described. The method and mold as described is adapted to the molding of any suitable plastic material curable at normal curing temperatures. In this connection well known organic plastics, such as natural rubber, butadiene-styrene copolymers, butadiene-acrylonitrile copolymers, reclaimed rubber, polychloroprene, etc., or compatible mixtures of any of the aforementioned may be used, after they are properly compounded, so that a cure may be accomplished by heating for a predetermined period. The particular compound used in the method is of no importance; the basic features of the invention being directed to a method and mold wherein the material is held therein during the molding and curing. Further the mold is held together during the same period without the use of a conventional molding press, or mold clamps heretofore required. The mold formed according to the above may have a single cavity within a single tube or a plurality of cavities if more tubes are used and may be placed in a rack, basket, or in any other suitable conveyor within the heating apparatus during the cure.

Further it is apparent that the plastic material may be bonded to any of these surfaces to which it is in contact if suitable well known methods for bonding are followed. The adherence of the elastomeric material with any of the parts may also be eliminated, if proper coatings thereon are employed.

While the embodiments of the present invention constitute preferred forms, it is to be understood that other forms might be adopted.

What is claimed is as follows:

1. In a method for molding vulcanizable elastomeric material and simultaneously bonding said material to surfaces of nested metallic tubes in concentric relation, the steps comprising; placing covers over the end portion of the concentric tubes, said covers having concentric annular means thereon adapted for maintaining said tubes in spaced concentric relation while deforming a portion of the ends of at least one of said tubes for securing said tube to the cover, applying pressure on the covers so as to deform the ends of a tube for forming an assembly having an annular mold cavity between the covers and the annular space between the concentric tube surfaces, positioning said assembly in an injecting means, injecting a sufficient quantity of unvulcanized elastomeric material under pressure into said cavity through an aperture provided in a side wall of one of said tubes leading to said mold cavity for filling said cavity and placing the material therein under compression, removing said assembly from said means, heating said assembly for vulcanizing the elastomeric material therein and for causing the material to bind in situ to the mold surfaces, and finally removing said covers from the end portions of the tubes to provide a unitary assembly of nested metallic tubes maintained in concentric spaced relation by an elastomeric tubular member having surfaces thereof bonded to contacting surfaces of the metallic tubes.

2. A mold suitable for molding curable plastic material, comprising in combination, a tube of predetermined length, a second tube having an aperture in a side wall thereof in nested concentric relation about the exterior of said first tube, a pair of end plates for providing a cover for the end portions of said tubes, concentric grooves on one surface of each of said plates for maintaining said tubes in spaced relation, one of said grooves in each plate being adapted for deforming the ends of one of the tubes whereby the plates and tubes are maintained in a secured relation when the tube end is deformed within said groove, the aperture in the second tube being constructed and arranged to permit the uncured material to be injected under pressure therethrough in one direction and to prevent the flow of the material in the opposite direction when the space between said covers and tubes is filled with injected material under pressure and the injecting pressure is removed.

3. In a method for molding curable plastic material between a metallic tube having a predetermined length and a second metallic tube having a predetermined length and an internal diameter larger than the external diameter of said first tube having a formed aperture in a surface thereof and an outwardly bent tang attached to said surface and formed of the material removed to form the aperture, the steps comprising, nesting the tubes to form an annular space therebetween, placing covers over the end portions of said tubes, securing said covers with respect to said ends for maintaining said tubes in nested concentric relation and forming an assembly having a mold cavity therein, applying an injecting means to said aperture for injecting a predetermined quantity of uncured plastic material under pressure through said aperture into said cavity and bending said tang portion to close said aperture for maintaining said pressure in said mold cavity, said material under pressure within said cavity, removing said injecting means from said closed aperture, heating said assembly for curing said plastic material, and finally removing said covers from the end portions of said tubes to provide a unitary assembly of nested metallic tubes maintained in concentric spaced relation by a plastic tubular member.

4. A mold suitable for molding curable plastic material, comprising in combination, a tube of predetermined length, a second tube in nested concentric relation with said first tube having a predetermined length and an internal diameter greater than the external diameter of said first tube and having an aperture and an outwardly bent and attached tang portion on an external surface of said second tube formed of the material removed from said tube surface when forming said aperture, a pair of end plates for providing a cover for the end portions of said tubes, concentric grooves on one surface of the plates whereby said tubes are maintained in spaced relation, one of said grooves being adapted for deforming an end of one of the tubes whereby the plates and tubes are maintained in a secured relation when the tube ends are deformed within said grooves, said tang and aperture being adapted for passing uncured plastic material in one direction into a space between said tubes and for restricting said passage when the tang is bent for closing said aperture.

References Cited in the file of this patent

UNITED STATES PATENTS

| | | |
|---|---|---|
| 830,432 | Hennessey | Sept. 4, 1906 |
| 1,161,194 | Cook | Nov. 23, 1915 |
| 1,251,973 | Kurtz | Jan. 1, 1918 |
| 2,131,319 | Greenholtz | Sept. 27, 1938 |
| 2,327,113 | Krotz | Aug. 17, 1943 |
| 2,724,864 | Krotz | Nov. 29, 1955 |

OTHER REFERENCES

Ser. No. 432,515, Paulsen (A. P. C.), published Apr. 27, 1943.